Patented July 14, 1953

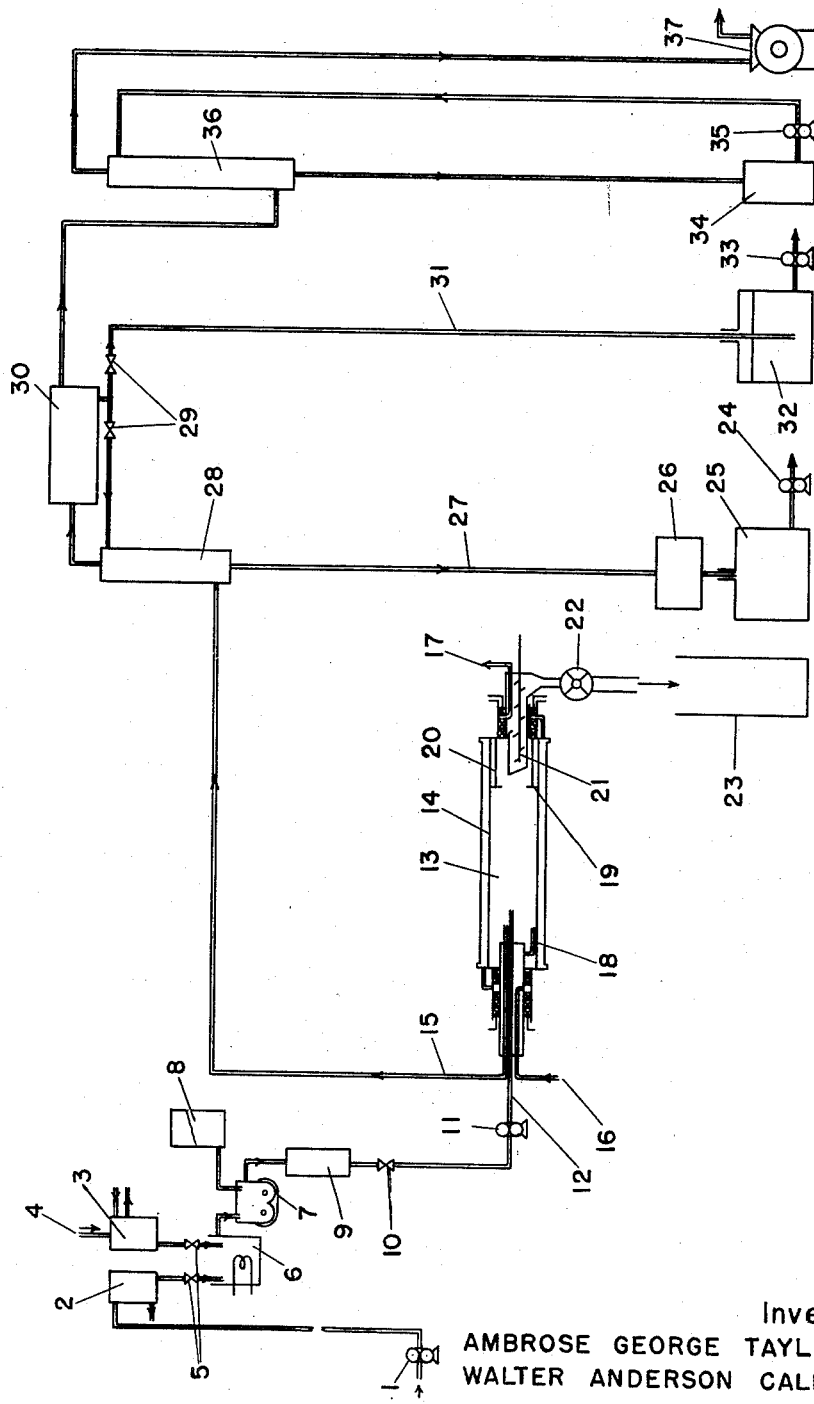

2,645,661

UNITED STATES PATENT OFFICE 2,645,661

MANUFACTURE OF FORMIC ACID

Ambrose G. Taylor, Ardrossan, and Walter A. Caldwell, Seamill, Scotland, assignors to Imperial Chemical Industries Limited, a corporation of Great Britain Application April 18, 1949, Serial No. 88,102
In Great Britain May 26, 1948

7 Claims. (Cl. 260—542)

The present invention relates to an improvement in the method for the production of formic acid by treatment of an alkaline earth metal formate with an approximately equimolecular quantity of sulphuric acid in the presence of formic acid as diluent.

As strong sulphuric acid readily decomposes formic acid into carbon monoxide and water it has not been found possible to obtain formic acid in good yield and of high strength by treating a dry solid metallic formate with sulphuric acid in quantity not more than that required for the double decomposition into the metallic sulphate and formic acid and distilling the formic acid from the mixture. It is found that immediately the sulphuric acid comes into contact with the alkaline earth metal formate the mass solidifies with evolution of heat owing to the formation of the alkaline earth metal sulphate, so that it cannot be effectively mechanically mixed, with the result that the formic acid so produced is decomposed into carbon monoxide and water wherever there is a local excess of sulphuric acid. A measure of success has been attained in the case of calcium formate by carrying out the reaction between the sulphuric acid and the calcium formate in the presence of a substantial quantity of formic acid as a diluent for the solid, so as to keep the mixture mobile, but hitherto the losses occasioned by decomposition of formic acid into carbon monoxide and water have been undesirably high and difficulties have been experienced owing to the fact that the contents of the distillation vessel, consisting essentially of slightly hydrated calcium sulphate and formic acid, stiffen and ultimately dry to a solid of poor heat conductivity as the distillation proceeds which has hitherto rendered efficient heat distribution through the mixture by mechanical agitation means very difficult.

According to the present invention the process for the manufacture of formic acid from a pasty mass formed by chemical interaction of an alkaline earth metal formate, substantially with an equimolecular quantity of sulphuric acid diluted with an aqueous solution of formic acid is characterised in that said pasty mass is subjected to distillation while being converted into dischargeable solid granulates by being introduced on to and advanced in tumbling fashion along a surface rotating around an axis at least nearly horizontal.

The alkaline earth metal formate is preferably calcium formate.

It is desirable that the aqueous solution of formic acid used to dilute the sulphuric acid should be of a concentration higher than that present in a constant boiling mixture of formic acid and water but less than 90%.

Furthermore it is preferred that the distillation should be carried out so as to produce condensed fractions consisting of a formic acid solution of not less than 90% formic acid concentration and a relatively weaker formic acid solution of less than 90% concentration, the latter being utilised as the diluent for the sulphuric acid to be mixed with a fresh quantity of the alkaline earth metal formate.

The sulphuric acid used may itself contain a small proportion of water, and the sulphuric acid is advantageously added with stirring and cooling to the aqueous formic acid solution of less than 90% concentration to be used as the diluent. The alkaline earth metal formate and the resulting acid mixture may then be mechanically mixed together, cooling at this stage being ordinarily unnecessary.

The amount of the aqueous formic acid used in starting the process may vary according to the particular apparatus available for mixing the acid mixture with the alkaline earth metal formate, but it is desirable that the amount of water present in the aqueous formic acid-sulphuric acid mixture should be at least about one sixth of the weight of the anhydrous sulphuric acid therein, calculated on the assumption that the formic acid is entirely undecomposed; and the amount of formic acid and water together on the same assumption is preferably not substantially less than the weight of the anhydrous sulphuric acid, so that sufficient fluidity will result for adequate mixing, and dissipation of the heat of reaction when the mixed acid is brought into contact with the alkaline earth formate. The loss by decomposition of formic acid at this stage is thereby minimised. The total amount of water in the resulting mixture, however, should be substantially lower than that present in a constant boiling mixture of formic acid and water at the pressure under which the subsequent distillation of the pasty mass is to take place, so that this distillation will bring over a substantial fraction of formic acid of concentration not less than 90%. The distillation is preferably conducted at a pressure below atmospheric, but it is also possible to carry it out at atmospheric pressure. Normally the whole of the formic acid condensate of less than 90% concentration will be reutilised as the diluent medium, and the ratio of make of the stronger formic acid condensate to recirculated diluent will therefore depend on the concentration of the stronger formic acid required and the amount of water present in the reaction mixture.

Any ordinary kind of mixer with powerful mechanical agitation and fitted with a cover, i. e. a Werner Pfleiderer mixer may be used for mixing the mixed acids with the alkaline earth metal formate. Preferably forced ventilation is provided.

Preferably the calcium formate and the aqueous composition of sulphuric acid and formic acid are run in as separate streams into a mixer which already contains a full charge of the pasty material of calcium sulphate-formic acid mixture and this mixture is withdrawn at the same rate as it is being formed by the addition of the said reagents. The pasty material is of such consistency when formed in this manner that it can be pumped by means of a gear pump into the distillation vessel.

The distillation vessel may consist of a cylindrical rotary vessel, with or without internal ribs or the like, with an inlet for the pasty mass and an outlet for the granules, this vessel preferably slanting slightly downwards from the said inlet to outlet, provided with heating means and with a fractionating distillation head at its upper end, and preferably also with means for reducing the internal pressure and sealing off the said inlet and outlet during the distillation against the entry of air. As the distillation is proceeding the pasty mass may for instance be extruded bodily through the inlet into the distillation vessel, and the dry granules may be carried out of it by means of a screw rotating in an outlet tube surrounded by a gland and leading to a suitably sealed receiver from which the granular material can be removed continuously or at intervals. The inlet for the paste and an outlet tube for the vapours leading to the fractionating head, pass through a common gland.

The invention is illustrated by the following example in which the parts are parts by weight and with reference to the accompanying diagrammatic drawing.

*Example*

97% concentrated sulphuric acid is pumped by means of pump 1 into a header 2. 88.5% formic acid obtained from receiver 25 is pumped by means of pump 24 into header 3 and water is introduced into this header through inlet 4. The sulphuric acid from header 2 and the diluted formic acid from header 3 are introduced into a mixing tank 6 through flowmeters 5 at such a rate that for every 1143 parts sulphuric acid there are 1000 parts of formic acid and 100 parts water. The mixing is carried out under cooling conditions so that the temperature remains below 40° C. In this way there is produced 2243 parts of a mixed acid containing 49.4% sulphuric acid, 29.5% formic acid and 11.1% water. 8 is a hopper for the calcium formate. Calcium formate is delivered from hopper 8 into the wet paste mixer 7 at such a rate that 1570 parts of technical calcium formate reacts with 2243 parts of the mixed acid. The mixed acid and the calcium formate are run in as separate streams into the wet paste mixer 7 which already contains a full charge of reacted material. The wet paste mixer 7 may be a Werner Pfleiderer mixer. The pasty calcium sulphate-formic acid mixture formed is withdrawn from the wet paste mixer 7 into a capacity vessel 9 for the paste from which it passes through a valve 10 into gear pump 11 by which it is pumped through a tube 12 into a heated approximately horizontally disposed rotary still 13 which is provided with a steam jacket 14, and which is rotating around its approximately horizontal axis. The paste inlet tube 12 and a second tube 15 which leads to fractionating column 28 pass through a common gland into the rotary still 13. 16 is a steam inlet for the jacket of the rotary still 13 and 17 is a condensate outlet. 18 is a short stationary scraper. The sausage-like stream of the pasty mass breaks up as it is picked up and tumbled by the wall of the rotary still 13 in its passage through which the distillation of nearly all its volatile acid content takes place and it gradually assumes the form of granules of slightly hydrated calcium sulphate still containing about 2% residual formic acid. A baffle 19 near the forward and slightly lower end of the rotary still 13 ensures that the material remains in this still for about 3 hours. Ribs 20 on its wall beyond this baffle 19 lift the granules to such a height that as they fall a sufficient proportion of the granular material falls into a screw conveyor 21 working in a tube to be carried out from the rotary still 13 at the same throughput rate as the pasty mass is fed into it. The granules of calcium sulphate fall through a rotary valve 22 into a bogey 23. 1600 parts of calcium sulphate are collected in this manner. The calcium sulphate contains 2% formic acid.

During the distillation the rotary still 13 is evacuated to a pressure of ⅓ atmosphere and the aqueous formic acid vapours are condensed into two fractions simultaneously of which the lower boiling consists of 1000 parts of 92.9% formic acid and the higher boiling fraction consists of 1000 parts of 88.5% formic acid. The stronger formic acid is collected in receiver 32 and the weaker formic acid is delivered into receiver 25. 24 is a pump for recycling the formic acid collecting in the receiver 25 into header 4. 26 is a cooler, 27 is a barometric leg, 28 is an empty column, 29 are flowmeters, 30 is a condenser and coller, 31 is a barometric leg, 32 is a receiver for the formic acid of 92.9% strength, 33 is a pump for withdrawing formic acid of 92.9% strength to storage. 34 is a receiver for dilute formic acid in which a further 100 parts of 16.5% formic acid are recovered by scrubbing the tail gases by means of dilute acid which is circulated from 34 by means of a pump 35 through an absorption column 36. The residual gases are then exhausted through a vacuum pump 37.

We claim:

1. A process for producing formic acid which comprises forming a pasty mass by chemically interacting a mixture consisting substantially of an alkaline earth metal formate with substantially an equal molecular quantity of sulfuric acid diluted with an aqueous solution of formic acid, the ratio of sulfuric acid to formic acid being greater than 1, continuously adding and tumbling said pasty mass on a heated surface rotating about a substantially horizontal axis, continuously distilling and withdrawing the volatilized formic acid, and continuously removing the resultant solid granules formed from said surface.

2. A process as set forth in claim 1 wherein the alkaline earth metal formate is calcium formate.

3. A process as set forth in claim 1 wherein the aqueous solution of formic acid used to dilute the sulfuric acid is of a concentration higher than that present in a constant boiling mixture of formic acid and water and less than 90%.

4. A process as set forth in claim 3 wherein the distillation is carried out so as to produce condensed fractions consisting of a formic acid solution of not less than 90% formic acid concentration and a relatively weaker formic acid solution of less than 90% concentration and in which the weaker formic acid solution is continuously reutilized as the sulfuric acid diluent.

5. A process as set forth in claim 1 wherein the amount of water present in the aqueous formic acid-sulfuric acid mixture is at least $\frac{1}{6}$ of the weight of the anhydrous sulfuric acid therein.

6. A process as set forth in claim 1 wherein the weight of formic acid and water combined is not substantially less than the weight of the anhydrous sulfuric acid present.

7. A process as set forth in claim 1 wherein the distillation is conducted at a pressure below atmospheric pressure.

AMBROSE G. TAYLOR.
WALTER A. CALDWELL.

References Cited in the file of this patent

UNITED STATES PATENTS

| Number | Name | Date |
|---|---|---|
| 1,848,504 | Strauss et al. | Mar. 8, 1932 |
| 2,174,008 | Mow | Sept. 26, 1939 |

FOREIGN PATENTS

| Number | Country | Date |
|---|---|---|
| 445,644 | Germany | June 16, 1927 |

OTHER REFERENCES

Richards and Locke, "Textbook of Ore Dressing," Third Ed., published 1940 by McGraw-Hill Book Co., Inc., New York, N. Y., pp. 69–75.